United States Patent [19]

Kobayashi

[11] Patent Number: 5,224,018

[45] Date of Patent: Jun. 29, 1993

[54] PORTABLE ELECTRONIC APPARATUS HAVING A REMOVABLE PRECISION UNIT AND A DEVICE FOR MOUNTING AND SECURING THE REMOVABLE PRECISION UNIT IN THE APPARATUS

[75] Inventor: Takaichi Kobayashi, Tokyo, Japan

[73] Assignee: Kabushiki Kaisha Toshiba, Kawasaki, Japan

[21] Appl. No.: 619,612

[22] Filed: Nov. 29, 1990

[30] Foreign Application Priority Data

Nov. 30, 1989 [JP] Japan ................... 1-311360

[51] Int. Cl.⁵ ............ H05K 7/12; H01R 13/635; E05C 1/08; G06F 1/00
[52] U.S. Cl. .................. 361/391; 361/380; 439/310; 292/170
[58] Field of Search ........... 439/157, 310, 347; 361/380, 392, 393, 394, 395, 399, 390, 391; 364/708; 292/137, 145, 170; 429/96, 97

[56] References Cited

U.S. PATENT DOCUMENTS

| | | | |
|---|---|---|---|
| 3,836,938 | 9/1974 | Barrett, Jr. et al. | 439/157 |
| 4,146,682 | 3/1979 | Nakao | 429/97 |
| 4,680,674 | 7/1987 | Moore | 361/395 |
| 4,850,890 | 7/1989 | Kuzuno et al. | 439/310 |
| 4,875,873 | 10/1989 | Ishizuka et al. | 439/347 |
| 4,903,222 | 2/1990 | Carter et al. | 364/708 |
| 4,958,889 | 9/1990 | Boyle et al. | 361/395 X |
| 5,010,426 | 4/1991 | Krenz | 364/708 X |
| 5,032,952 | 7/1991 | Cooke et al. | 361/392 |
| 5,045,960 | 9/1991 | Eding | 361/391 X |

FOREIGN PATENT DOCUMENTS

| | | |
|---|---|---|
| 0335490 | 10/1989 | European Pat. Off. |
| 3730020 | 9/1988 | Fed. Rep. of Germany ...... 439/347 |
| 8806780 | 9/1988 | PCT Int'l Appl. |
| 2021334 | 11/1979 | United Kingdom. |

OTHER PUBLICATIONS

A catalog of Epson PC-386LS, 32-Bit Laptop PC (no translation).

*Primary Examiner*—Leo P. Picard
*Assistant Examiner*—Michael W. Phillips
*Attorney, Agent, or Firm*—Cushman, Darby & Cushman

[57] ABSTRACT

A case having a flat recess in the base thereof is provided together with a flat hard disk drive device adapted to be fitted into the recess. In mounting the disk drive device in the recess, the drive device is gradually put into the recess by means of lock mechanisms after being temporarily stopped in the middle of the housing operation. By doing this, the hard disk drive device can be fitted into the recess with a reduced impact thereon.

7 Claims, 14 Drawing Sheets

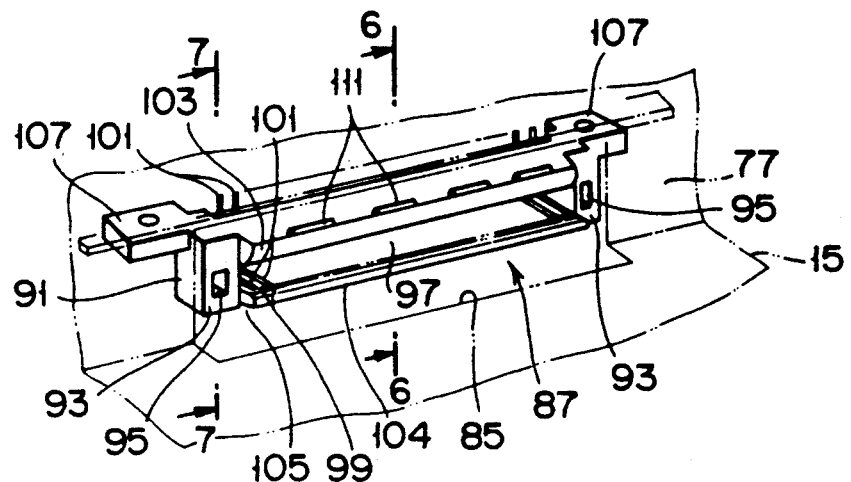
FIG. 5
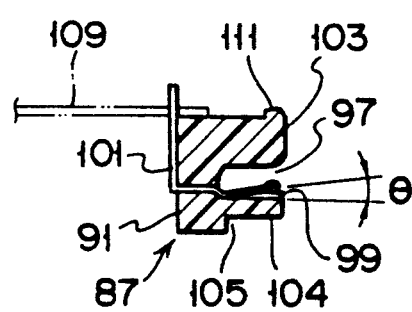  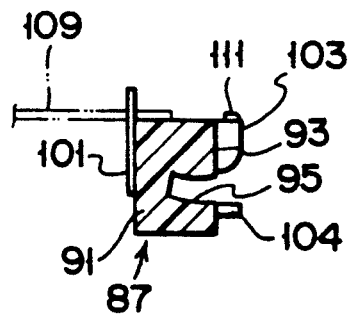
FIG. 6  FIG. 7

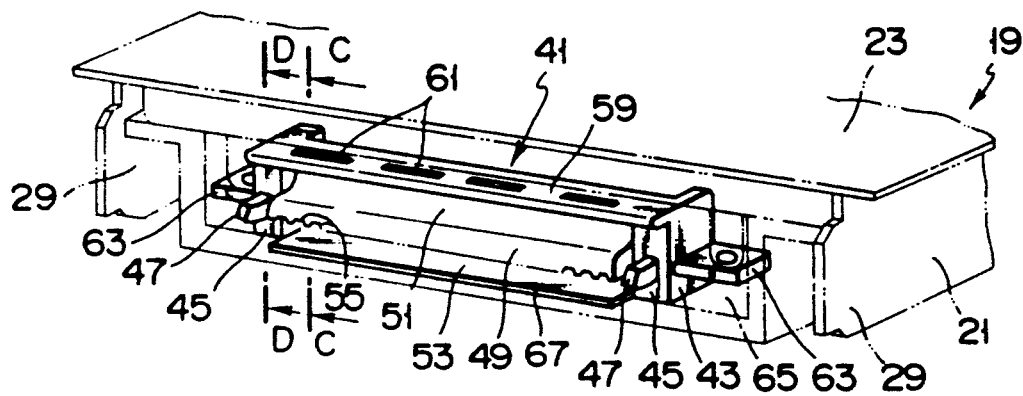
FIG. 8
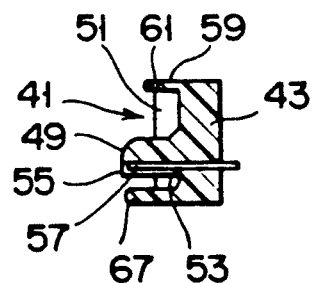 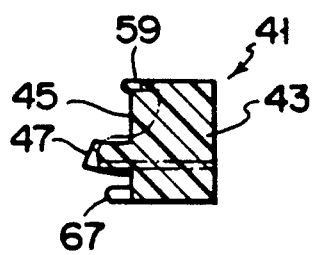
FIG. 9  FIG. 10

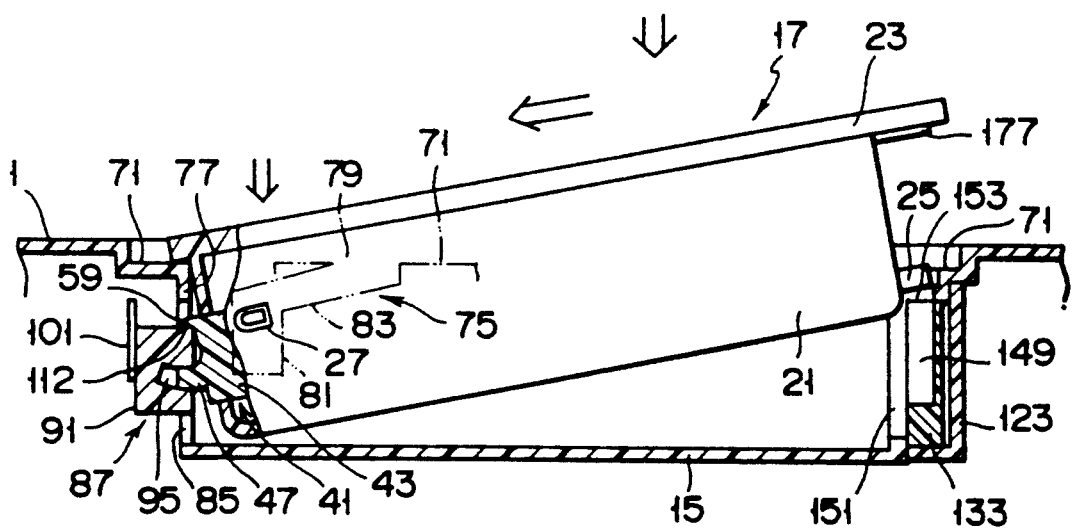
F I G. 21
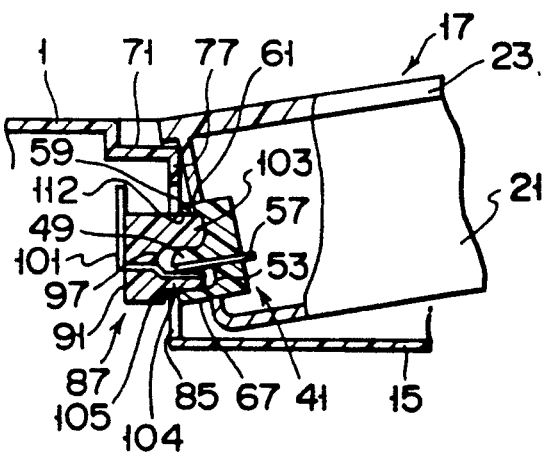
F I G. 22
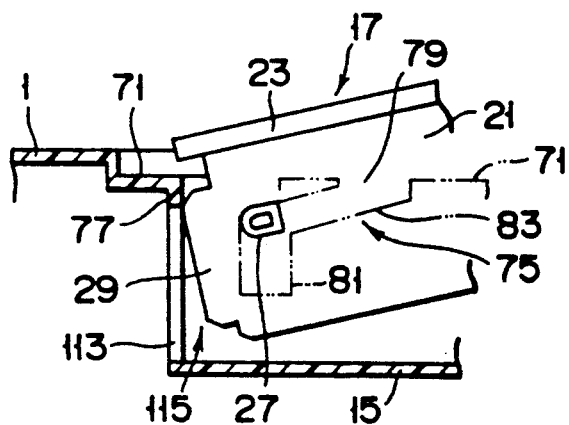
F I G. 23

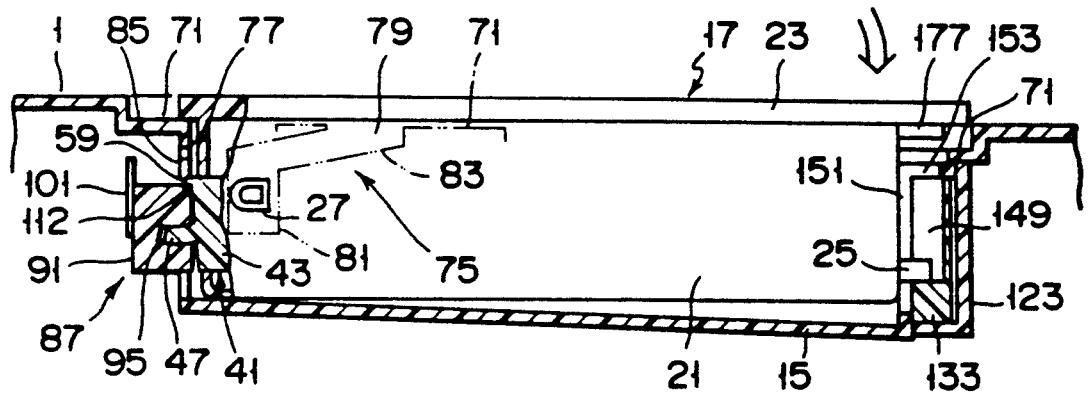
F I G. 24
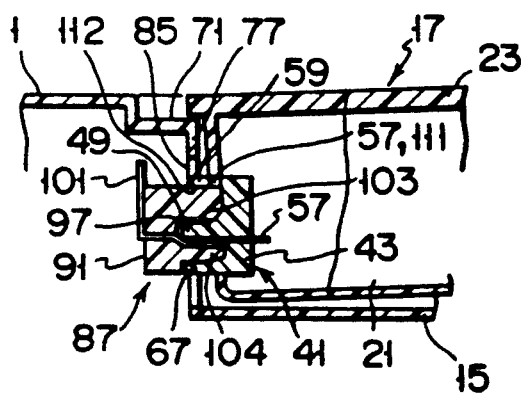
F I G. 25

PORTABLE ELECTRONIC APPARATUS HAVING A REMOVABLE PRECISION UNIT AND A DEVICE FOR MOUNTING AND SECURING THE REMOVABLE PRECISION UNIT IN THE APPARATUS

BACKGROUND OF THE INVENTION

1. Field of the Invention

The present invention relates to a portable electronic apparatus, such as a laptop personal computer, word processor, etc., and more particularly, to a portable electronic apparatus designed so that an electronic precision unit for signal input and output, such as data transmission, can be externally mounted, and a method for mounting the electronic precision unit.

2. Description of the Related Art

Some laptop computers are arranged so that a electronic precision unit, for example, a memory such as a cableless HDD (hard disk drive device) is mounted on a rear face of a case.

In this arrangement, the HDD contains a drive unit for driving a hard disk, in its case in the form of a flat box and an electronic device for writing in or reading data from the hard disk. One end portion of the case has a first connector. The drive unit and the electronic device are connected to the first connector. Thus, electric power for drive or data for writing or reading is transmitted through the first connector which is attached to a side portion of the HDD.

A passage, in which the HDD can be inserted, is formed in the rear wall of the case of the laptop computer. The passage has an opening on the rear face of the case, corresponding in shape to an end portion of the HDD. The passage includes a passage portion which, formed inside the case, has one end portion connecting with the opening and the other end portion extending toward the front of the case. The other end portion of the passage portion has a second connector which can be connected to the first connector. The second connector is connected to various electronic devices contained in the case. The opening is provided with a locking device.

In mounting the HDD in the laptop computer using this arrangement, the one end portion of the HDD is aligned with the opening. Then, the one end portion of the HDD is inserted into the passage portion through the opening. This insertion is continued until the first and second connectors are connected to each other. When this insertion is finished, the HDD is housed in the passage portion. Thereafter, when the gate is closed by means of a cover after the HDD is locked by the locking device, the HDD is set in place in the case.

According to this arrangement for mounting, the HDD is set so that it is fitted at once into a recess. In some cases, therefore, the HDD itself is subjected to a substantial impact when it is mounted into the recess. Unlike a battery pack, the HDD has a precision structure such that the hard disk and a head are liable to come into contact with each other through the gap between them. The HDD, therefore, is particularly susceptible to an impact. More specifically, when the hard disk and the head impulsively run against each other, the surface of the head, which is essential to data input and output, may possibly be damaged, thus entailing problems in reading or writing data. After the HDD is mounted in the case, therefore, it sometimes cannot function correctly.

SUMMARY OF THE INVENTION

Accordingly, the object of the present invention is to provide a portable electronic apparatus in which an electronic precision unit can be mounted in a case with a minimized impact thereon.

In order to achieve the above object, an electronic apparatus according to the present invention comprises: a case having a recess; an electronic precision unit adapted to be fitted in the recess; and setting means for gradually putting the electronic precision unit into the recess after suspending the motion of the precision unit in the middle of the operation to house the unit.

In mounting the electronic precision unit according to the present invention into the case, the electronic precision unit is first located so as to face the opening of the recess, and is then put into the recess. In housing the precision unit, it is gradually put into the recess after being temporarily stopped in the middle of the housing operation by setting means.

In the portable electronic apparatus of the invention, the electronic precision unit is gradually put into the recess after being temporarily stopped in the middle of the housing operation, so that only a small impact is applied to the precision unit when it is mounted in position. Thus, the electronic precision unit, which is susceptible to an impulsive force, can be mounted in the case securely.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 5 is a detailed perspective view of a second connector shown in FIG. 2;

FIG. 6 is a sectional view of the second connector taken along line 6—6 of FIG. 5;

FIG. 7 is a sectional view of the second connector taken along line 7—7 of FIG. 5;

FIG. 8 is a detailed perspective view of a first connector shown in FIG. 2;

FIG. 9 is a sectional view of the first connector taken along line 9—9 of FIG. 8;

FIG. 10 is a sectional view of the first connector taken along line 10—10 of FIG. 8;

FIG. 21 is a sectional view showing the way the HDD shown in FIG. 2 is obliquely inserted into the recess;

FIG. 22 is a sectional view showing the way armatures of the first and second connectors come into contact with each other as the HDD shown in FIG. 21 is inserted;

FIG. 23 is a sectional view showing the way a hook on the HDD side and a socket on the recess side are located in their respective positions for engagement as the HDD shown in FIG. 21 is inserted;

FIG. 24 is a sectional view showing a process in which the HDD shown in FIG. 21 is fitted into the recess as it rocks around the point of contact between the first and second connectors in engagement with each other;

FIG. 25 is a sectional view showing a process in which the respective armatures of the first and second connectors shown in FIG. 22 come to overlap each other as the HDD rocks around the point of contact between the first and second connectors in engagement with each other;

DETAILED DESCRIPTION OF THE PREFERRED EMBODIMENT

Figure 1:
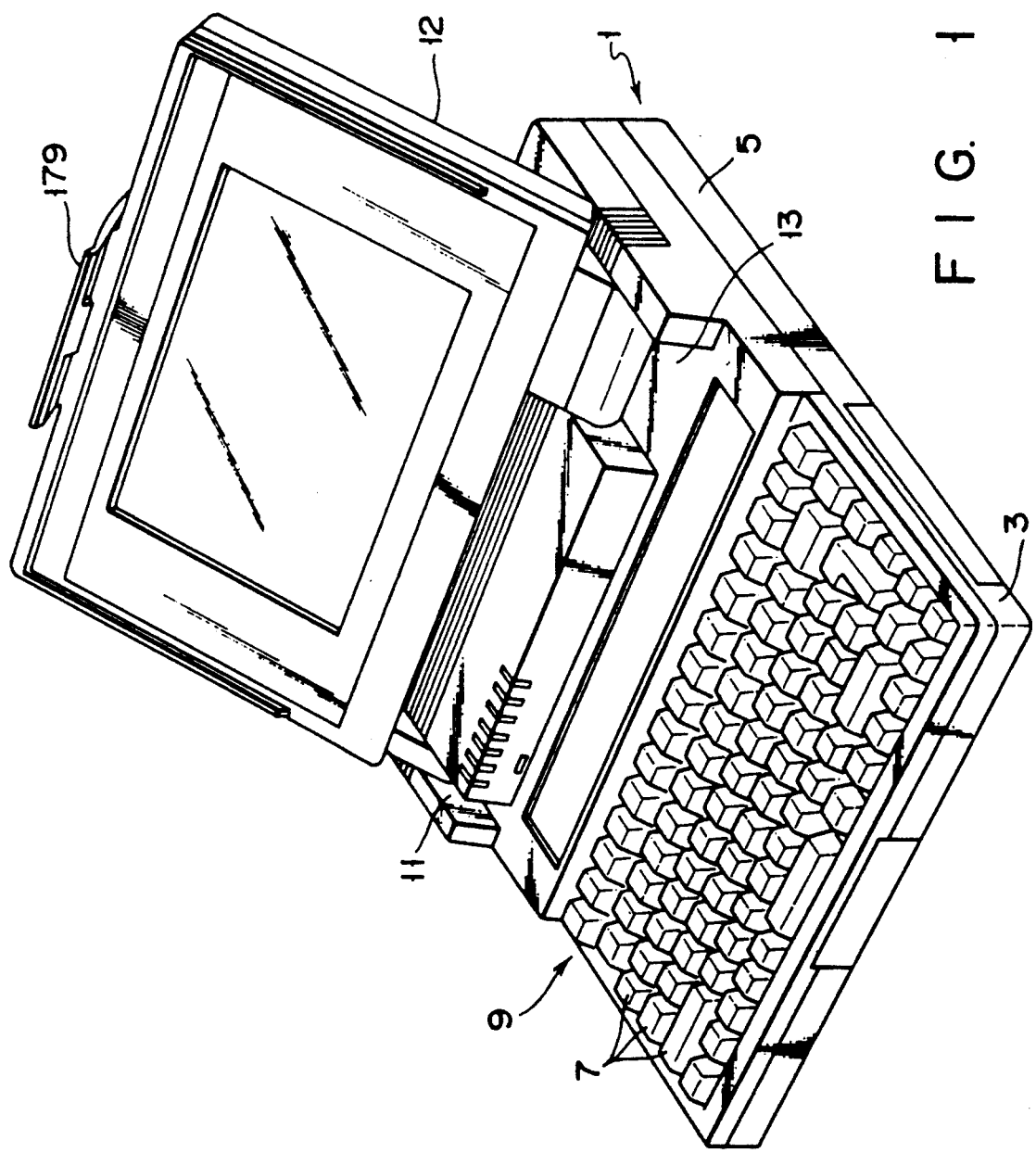
FIG. 1 is a perspective view of a personal computer incorporating a mechanism for loading or unloading an HDD according to the present invention.

One embodiment of the present invention will now be described with reference to the accompanying drawings of FIGS. 1 to 28. FIG. 1 is a perspective view of a laptop portable personal computer. In FIG. 1, numeral 1 denotes a case which is in the form of a flat box. The case 1 has a front section 3 and a rear section 5, the former being thinner than the latter. The case 1 contains therein various electronic devices (not shown).

The front section 3 includes a keyboard 9 which have a large number of keys 7 arranged on the top.

The rear section 5 includes recesses 11 and 13 at the opposite sides of the front end portion thereof. These recesses 11 and 13 are fitted individually with legs of a flat display 12 which is rotatably mounted.

Figure 2:
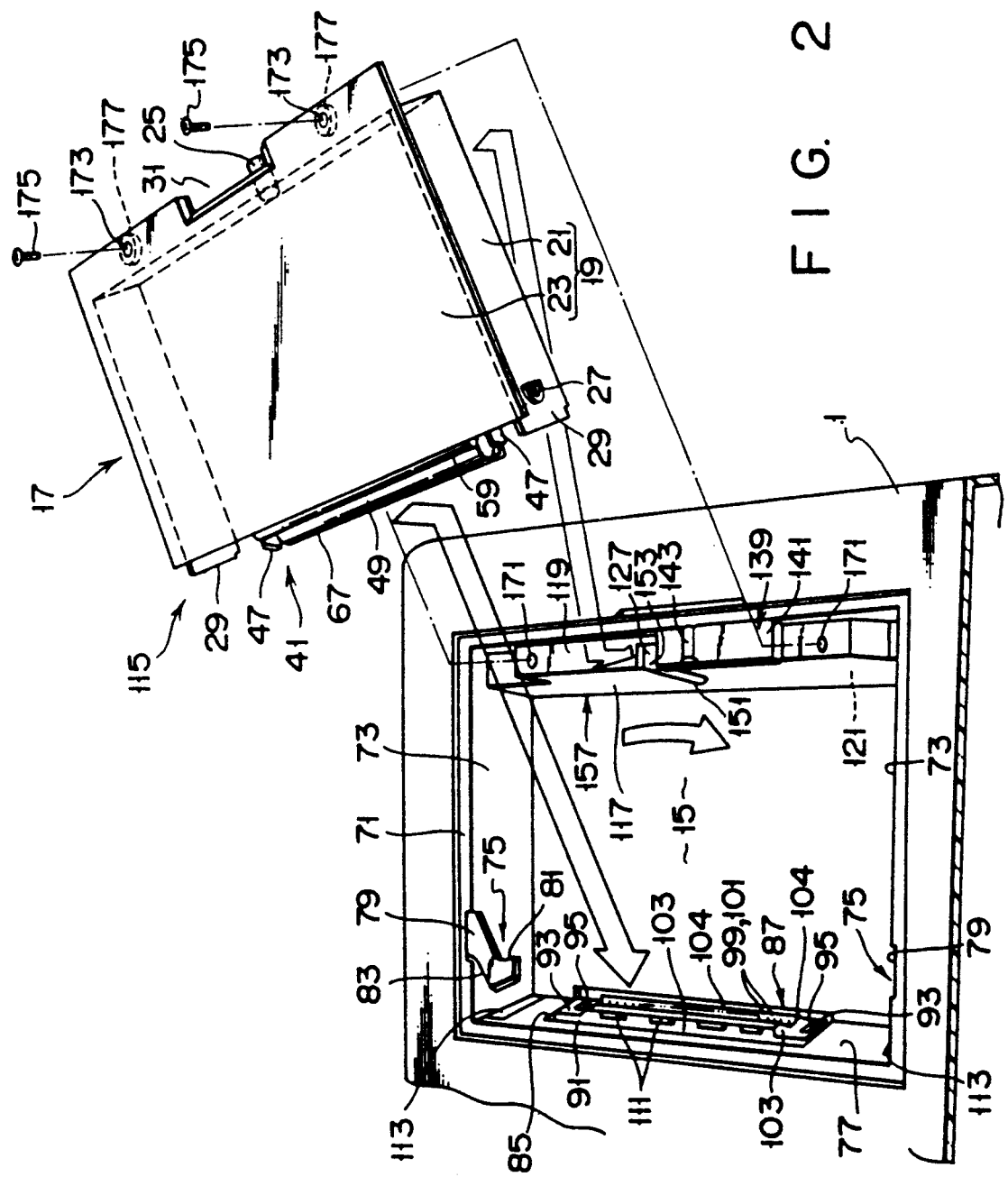
FIG. 2 is an exploded perspective view of the personal computer shown in FIG. 1 with the HDD outside its case.
Figure 3:
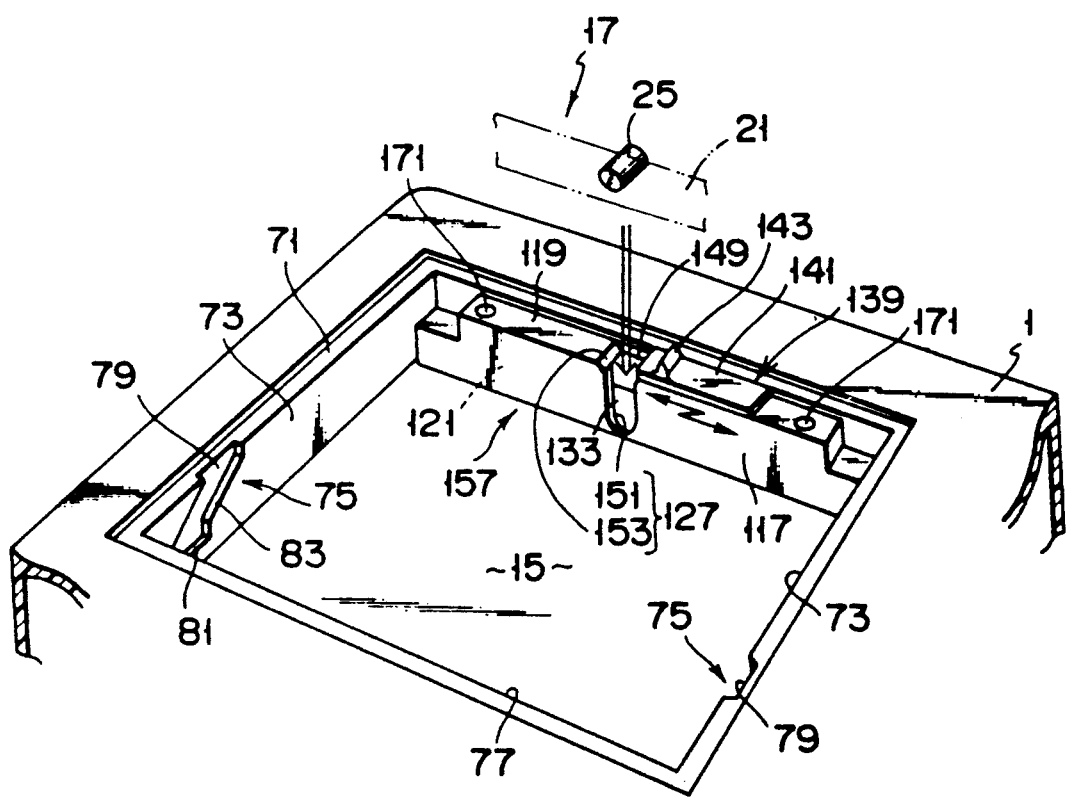
FIG. 3 is a perspective view showing an outline of a lock mechanism for locking or unlocking the HDD shown in FIG. 2.

As shown in FIGS. 2 and 3, a recess 15 is formed at the bottom of the rear section 5. The recess 15 has a base portion between the rear and left-hand side faces of the rear section 5. An electronic precision unit, for example, a storage device such as a flat cableless HDD (hard disk drive device) 17 is mounted in the recess 15.

As shown in FIG. 2, the HDD 17 has a casing 19. The casing 19 is a combination of a case 21 in the form of a flat rectangular box and a cover 23 in the form of a rectangular plate. The HDD 17 has one end portion on the front side of the casing 19 and the other end portion on the rear side.

The case 21 is open at the top and the front. A first projection 25 is formed on that portion of the rear face of the case 21 which is situated closer to the base. The projection 25, which has the shape of a column, protrudes rearward from the case 21. Further, a pair of second projections 27 are formed individually on the respective front portions of the side faces of the case 21. Each second projection 27 is in the form of a plate having an arcuate portion directed to the front of the case 21. The case 21 has a pair of hooks 29 on its front. Each hook 29 is formed of a forwardly projecting central portion of the front end of each side wall of the case 21. The upper and lower corner portions of each hook 29 are chamfered.

The cover 23, which is larger than the rectangular configuration of the case 21 in size, is mounted on the case 21 so as to close the top opening thereof. Thus, the casing 19 has an opening at the front. The cover 23 projects longer at the rear portion than at the front and side portions. A rectangular notch 31 is formed in the center of the rear projecting portion of the cover 23 so as to extend along its edge.

The casing 19 contains various electronic devices (not shown), typically including a hard disk, a device for driving the hard disk, and a device for writing in or reading data from the hard disk. As shown in FIG. 8, a first connector 41 is attached to a front opening 65 of the casing 19.

The first connector 41 has a connector body 43, which is in the form of a horizontally extending rectangular prism. A pair of flat vertical surfaces 45 for butting are formed individually on the opposite sides of the front face of the connector body 43. As also shown in FIG. 10, a guide projection 47 protrudes from the center of each vertical surface 45. The guide projection 47 extends in an upward arc. As also shown in FIGS. 9 and 10, a ledge 49 is formed on that portion of the front face of the connector body 3 which is situated between the vertical surfaces 45. The ledge 49 is situated halfway between the top and bottom of the connector body 43. The extreme end portion of the ledge 49 projects forward beyond the vertical surfaces 45. That front portion of the connector body 43 which is surrounded by the respective upper surfaces of the ledge 49 and the body 43 and the two vertical surfaces 45 are recessed. That front portion of the connector body 43 which is surrounded by the respective lower surfaces of the ledge 49 and the body 43 and the surfaces 45 are also recessed. These elongated recesses 51 and 53 are used for connection.

The flat lower surface of the ledge 49 is formed having a large number of grooves 55 extending parallel to one another between the vertical surfaces 45. As shown in FIGS. 9 and 10, a connecting terminal 57 is fixed to the base of each groove 55 so that it is exposed to the space inside the recess 53. The lead-side end portion of the connecting terminal 57 penetrates the rear-side body portion of the recess 53, and projects outward from the back of the connector body 43. These connecting terminals 57 are connected to the electronic devices in the casing 19. The upper corner portion of the extreme end of the ledge 49 is rounded for smooth insertion.

The whole upper front edge of the connector body 43 constitutes a guide wall 59 (equivalent to a projection of the present invention), which is in the form of a flat plate. The extreme end portion of the guide wall 59 projects forward beyond the vertical surfaces 45. Four rectangular, openings 61 are formed in the end portion of the guide wall 59 so as to be arranged along the end edge thereof. Further, the whole lower edge of the connector body 43, which is situated between the vertical surfaces 45, constitutes a fitting wall 67, which is also in the form of a flat plate. The extreme end portion of the fitting wall 67 projects forward so as to be flush with the extreme end of the ledge 49.

A leg 63 is formed at each end portion of the connector body 43. The legs 63 are fixed in the opening 65 by screws (not shown). Thus, the first connector 41 is mounted in a position such that the guide wall 59 and fitting wall 67, guide projections 47, and ledge 49 project beyond the front face of the case 21.

As shown in FIG. 2, the recess 15 is formed having a rectangular stepped portion 71 which extends throughout the opening edge and corresponds in shape to the cover 23. Thus, the HDD 17 can be set in the recess 15 so that the cover 23 constitutes part of the case 1.

The recess 15 has a pair of guide grooves 75 individually on its side walls 73 which correspond to the second projections 27. Both these grooves 75 are located on the side of that side wall 77 of the recess 15 which corresponds to the front of the HDD 17. As shown in FIGS. 2 and 3, each guide groove 75 includes a channel-shaped opening 79 cut in the horizontal stepped portion 71 and a locking groove 81 formed in each corresponding side wall 73 so as to be situated closer to the end of the wall 73. The groove 81 extends in the direction of the depth of the recess 15. The upper end of the locking groove 81 and the opening 79 communicates with each other by a slant groove 83 which is angled toward the side wall 77. The slant groove 83 has a width corresponding to that of each second projection 27 of the HDD 17. Also, the opening 79 and the locking groove 81 have a width corresponding to the length of each second projection 27. Thus, each second projection 27 can be slidably fitted into the opening 79, slant groove 83, and locking groove 81. The slant groove 83 is inclined at an angle such that the front portion of the HDD 17 and the side wall 77 of the recess 15 obliquely face each other. This angle of inclination will be described later. By inserting the second projections 27 into the slant grooves 83 of the guide grooves 75 through the openings 79, the HDD 17 can be obliquely fitted into the recess 15 so that its front portion is directed to the side wall 77 of the recess 15.

As shown in FIG. 2, the side wall 77 of the recess 15 has a rectangular opening 85 in the center. The opening 85 extends in the longitudinal direction of the wall 77. As shown in FIG. 5, the opening 85 is fitted with a second connector 87 which mates with the first connector 41.

The second connector 87 has a connector body 91, which is in the form of a horizontally extending rectangular prism corresponding to the connector body 43. A pair of flat vertical surfaces 93 for butting are formed individually on the opposite sides of the front face of the connector body 91, corresponding in position to the vertical surfaces 45. As shown in FIG. 7, a recess 95 is formed in the center of each vertical surface 93. It is an inwardly extending passage in which the guide projection 47 can be fitted. The recess 95 extends in an upward arc which corresponds in shape to the arc of each boss 47. As is also shown in FIGS. 6 and 7, an elongate recess 97 capable of engagedly receiving the ledge 49 is formed on that portion of the front face of the connector body 91 which is situated between the vertical surfaces 93. The recess 97 is situated halfway between the top and bottom of the connector body 91. The flat base of the recess 97 is formed having a large number of grooves 99 extending parallel to one another between the vertical surfaces 93. As shown in FIG. 6, a second connecting terminal 101 is disposed on the base of each groove 99. The distal end portion of the second connecting terminal 101, which is exposed to the inside of its corresponding groove 99, is inclined upward at an angle $\theta$ around the base side of the recess 97. The lead-side end portion of the connecting terminal 101 penetrates the rear-side body portion of the recess 97, and projects outward from the back of the connector body 91. The lead side of the second connecting terminal 101 is L-shaped, extending upward along the back of the connector body 91.

A projection 103 capable of releasably engaging the recess 51 is formed on the upper front portion of the connector body 91 which adjoins the recess 97. Likewise, a projection 104 capable of releasably engaging the recess 53 is formed on the lower front portion of the body 91 which adjoins the recess 97. Further, a stepped portion 105 capable of releasably engaging the fitting wall 67 is formed at the lower front portion of the body 91.

A leg 107 is formed at each end portion of the connector body 91. The legs 107 are fixed in the opening 85 by screws (not shown). Thus, the second connector 87 is mounted in a position such that the vertical surfaces 93 and the projections 103 and 104 project from the side wall 77 into the recess 15. The lead-side end portion of each second connecting terminal 101 is connected through a printed board 109 to an HDD drive control circuit (not shown) which is housed in the case 1.

Figure 12:
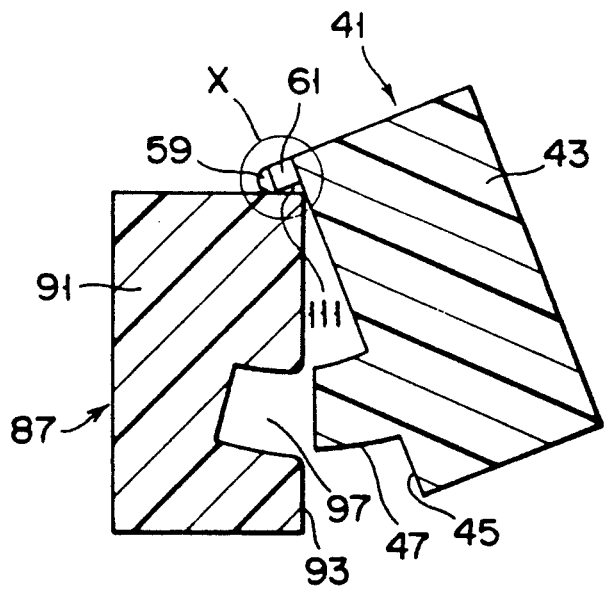
Figure 13:
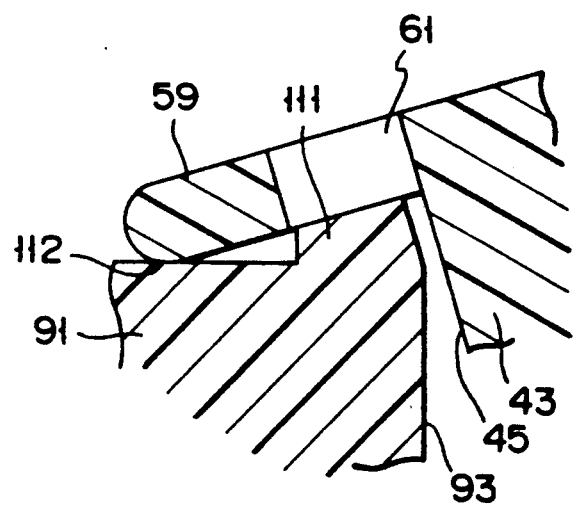
FIG. 13 is an enlarged sectional view of a section XIII shown in FIG. 12.
Figure 14:
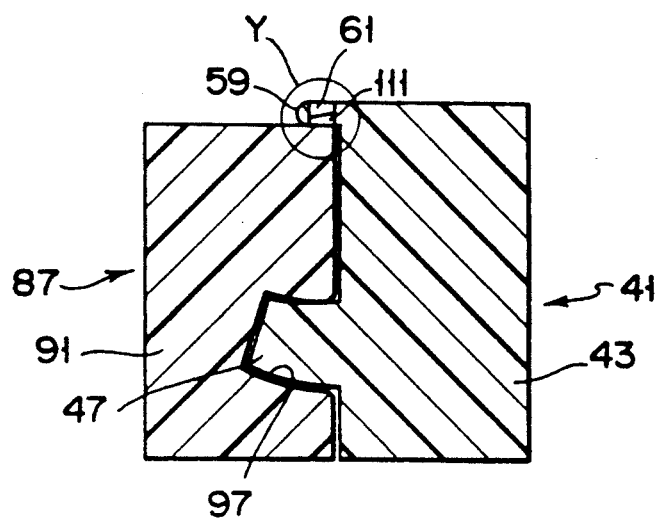
FIG. 14 is a sectional view showing a state in which the first and second connectors shown in FIG. 12 are connected to each other by rocking motion of the HDD.
Figure 26:
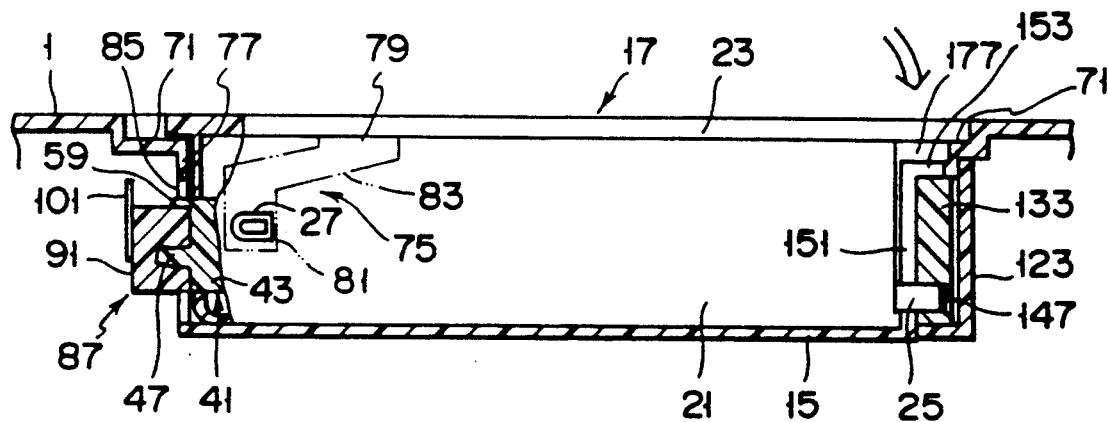
FIG. 26 is a sectional view showing a state in which the whole HDD shown in FIG. 21 is fitted in the recess.

As shown in FIGS. 12 and 13, the guide wall 59 of the first connector 43 and the upper surface of the second connector 87 are arranged so as to engage each other when the HDD 17 is obliquely inserted to its fullness into the recess 15. In the present embodiment, the angle of inclination of the guide grooves 75 is set at 15°, in consideration of smooth insertion of the HDD 17, so that the extreme end portion of the guide wall rib 59 engages that portion of the upper surface of the second connector 87 which is situated close to the front edge portion when the HDD 17 is inserted at the angle of 15°. Thus, if an external force is applied to the HDD 17 in the direction to swing it down (toward the base of the recess 15) after the front portion of the HDD 17 is obliquely inserted into the recess 15, as shown in FIGS. 21, 24 and 26, the whole HDD 17 is fitted into the recess 15 while pivoting around the point of contact between the guide wall 59 and an upper surface portion 112

(equivalent to a seat portion of the present invention) of the second connector 87.

The positional relationships between the guide projections 47 and the recesses 95 and between the ledge 49 and the recess 97 are set so that they partially engage one another when the HDD 17 is obliquely inserted to its fullness, and that they are entirely fitted with one another as the HDD 17 is pivoted thereafter. Also, the first and second connecting terminals 57 and 101 are designed so as to slidingly overlap each other as the whole HDD 17 is fitted into the recess 15.

Thus, the first and second connectors 59 and 87 are connected for required electrical conduction as the HDD 17 is fitted into the recess 15.

Figure 15:
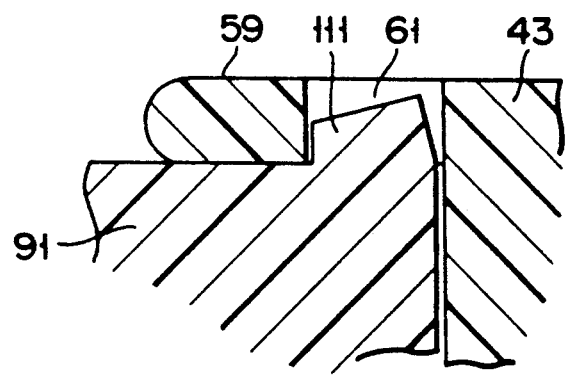
FIG. 15 is an enlarged sectional view of a section XV shown in FIG. 14.

As shown in FIGS. 5, 6 and 13, projections 111, which are adapted to be fitted individually into the openings 61 as the HDD 17 is pivoted after the insertion, are formed at those upper surface portions of the connector body 91 which correspond to the openings 61. By the engagement between the projections 111 and the openings 61, the first and second connectors 41 and 87 can be relatively positioned so as not to be deviated widthwise from each other after the insertion. The projections 111 are shaped so that the insertion of the HDD 17 cannot be hindered thereby, and preferably, are substantially trapezoidal, as shown in FIGS. 13 and 15. The angle 8 of inclination of the connecting terminal 101 is adjusted to 15°, which is equal to the angle of insertion, so that the first and second connecting terminals 57 and 101 can come smoothly into contact with each other as the HDD 17 is fitted into the recess 15.

Figure 28:
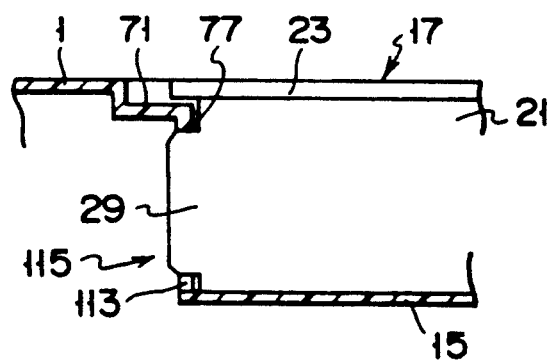
FIG. 28 is a sectional view showing a state in which the hook on the HDD side and the socket on the recess side, shown in FIG. 23, are fully in engagement with each other after the HDD is rocked around the point of contact between the first and second connectors in engagement with each other.

As shown in FIG. 2, the side wall 77 of the recess 15 is formed having a pair of sockets 113 on the opposite sides of the opening 85 which correspond to the hooks 29, individually. Each socket 113 is in the form of a slit capable of releasably engaging its corresponding hook 29. The sockets 113 and the hooks 29 are designed so that the chamfered portions of the hooks 29 engage the opening edges of their corresponding sockets 113 when the HDD 17 is fully inserted, as shown in FIG. 23. Thus, the sockets 113 and the hooks 29 releasably engage one another as the HDD 17 is pivoted after the insertion, as shown in FIG. 28. The front side of the HDD 17 fitted in the recess 15 can be fixed by means this first lock mechanism 115. Namely, the front portion of the HDD 17 is fixed by means of the connectors and the lock mechanism 115.

Figure 16:
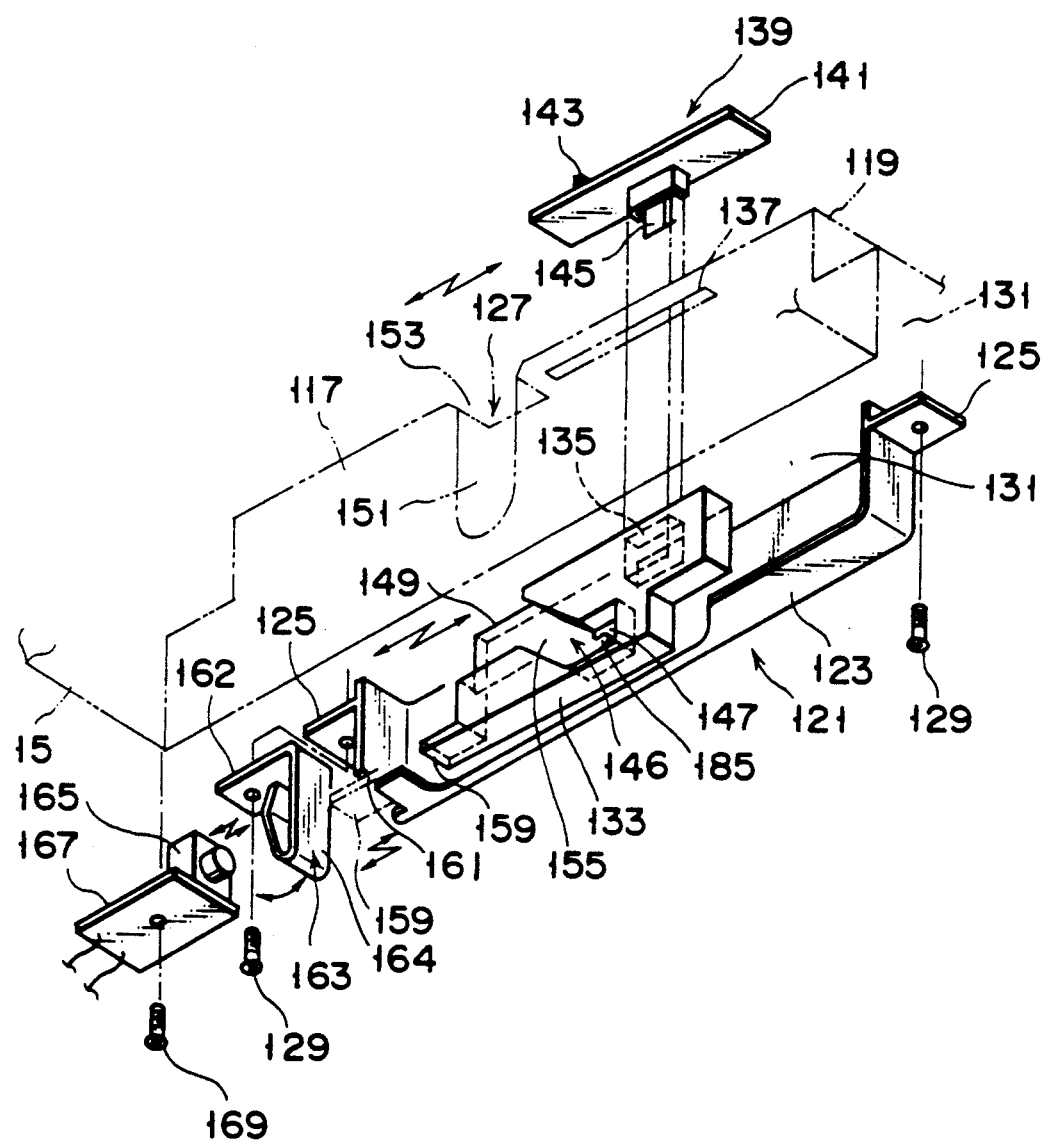
FIG. 16 is an exploded perspective view of a second lock mechanism shown in FIGS. 2 and 3.
Figure 17:
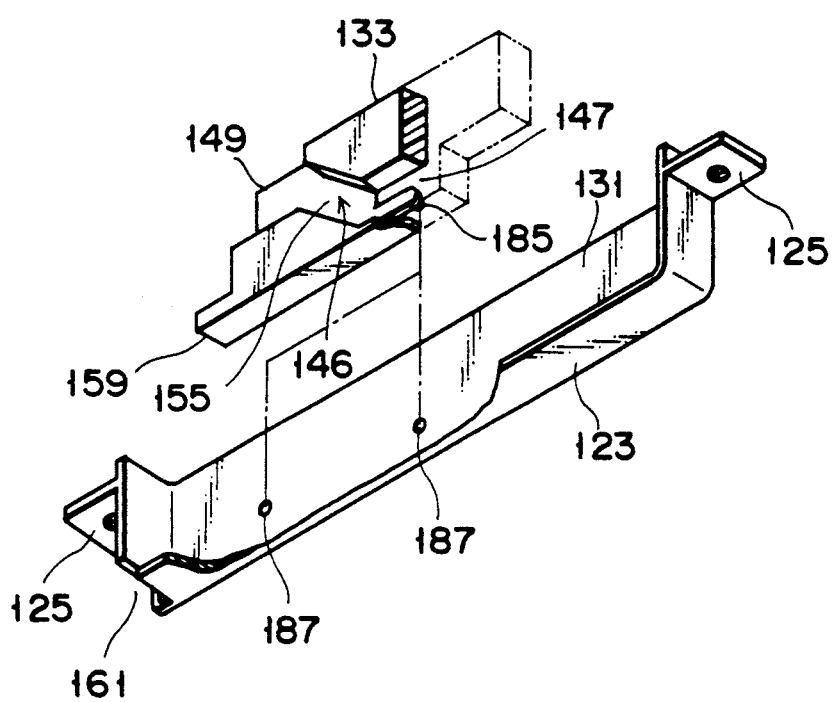
FIG. 17 is a perspective view of a stopper mechanism for a slider shown in FIG. 16.

As shown in FIGS. 2 and 16, a slider mechanism 121 is disposed outside that side wall 117 of the recess 15 which corresponds to the rear portion of the HDD 17.

The following is a description of the slider mechanism 121. As shown in FIGS. 2 and 3, the whole side wall 117 and a horizontal portion of the stepped portion 71 continuous therewith are situated lower (closer to the base of the recess 15) than the stepped portion 71, except for the outer peripheral part of the horizontal portion of the stepped portion 71. The side wall 117 and a top wall portion 119 (whole top wall including the portion lower than the stepped portion 71) continuous therewith are formed having a notch 127, corresponding in position to the first projection 25 of the HDD 17. The notch 127 is formed of a rectangular opening 153 cut in the top wall portion 119 and a channel-shaped opening 151 formed vertically extending in the side wall 117 so as to communicate with the opening 153. The notch 127 has a width such that it can receive the first projection 25 as the HDD 17 is fitted into the recess 15.

A cover 123 is disposed outside the side wall 117, as shown in FIG. 16. It is in the form of a vertical flat box open at the front and the top. The thickness or width of the cover 123 corresponds to the width of the top wall portion 119, while its height is equivalent to that of the side wall 117. The length of the cover 123 is longer than half that of the side wall 117. A planar lug 125 is formed on each end wall of the cover 123. The cover 123 is attached to the right-hand end of the side wall 117 so that its front and top openings face the outer surface of the wall 117 and the lower surface of the top wall portion 119, respectively. The cover 23 is mounted by fixing the lugs 125 to the case 1 by screws 129. Thus, a passage 131 is defined at a flat portion surrounded by the outer surface of the side wall 117, the lower surface of the top wall portion 119, and the notch 127, inside the cover 123. Housed in the passage 131 is a slider 133 which can slide in the longitudinal direction of the side wall 117.

The slider 133 is in the form of a rectangular plate having a thickness and a height corresponding to the cross-sectional shape of the passage 13. A retaining socket 135 is formed at the right-hand side of the upper surface of the slider 133. A knob 139 is attached to the socket 135 through an aperture 137, which is formed on the right of the notch 127 in the top wall portion 119.

The knob 139 includes a rectangular plate 141 which has a thickness corresponding to the difference in level between the stepped portion 71 and the top wall portion 119 and a width equivalent to that of the portion 119. A projection 143 for operation is formed on the upper surface of the plate 141. A hook 145 protrudes from the lower surface of the plate 141. The hook 145 and the retaining socket 135 are releasably engaged with each other through the aperture 137. In this manner, the knob 139 and the slider 133 are connected to each other.

The aperture 137 is in the form of a slit extending in the longitudinal direction of the top wall 119. Thus, the slider 133 slides in the passage 131 as the knob 139 is slid. When the knob 139 is slid fully to the right, the slider 133 is in an unlocking position. When the knob 139 is lid fully to the left, the slider 133 is in a locking position. The slider 133 in each of these positions can be positioned through releasable engagement between a projection 185 on its back, which can project and retreat, and two recesses 187 in the inner surface of the cover 123, corresponding to the unlocking and locking positions.

A locking groove 146 is formed in the front face (surface facing the side wall 117) of the slider 133. The groove 146 has a rectangular recess 149 on that front face portion thereof which faces the notch 127 when the slider 133 is slid to the unlocking position. The bottom portion (corresponding to the base of the rectangular configuration) of the recess 149 is situated corresponding to the middle of the height of the channel-shaped opening 151. The upper part of the recess 149 communicates with the opening 153 of the notch 27, while the left-hand portion of the recess 149 communicates with the left-hand side portion of the passage 131.

Further, the locking groove 146 includes a retaining groove 147 on that front face portion thereof which faces the base portion of the opening 151 when the slider 133 is slid to the locking position. The groove 147 extends in the longitudinal direction of the side wall 117 (in the direction perpendicular to the direction in which the first projection 25 passes the notch 127).

The left-hand end of the retaining groove 147 and the whole right-hand end of the recess 149 communicates with each other by a slant groove 155 which, formed in the front face of the slider 133, is angled toward the right. A passage defined by the recess 149, the slant groove 155, and the retaining groove 147 is sized so that it can pass the first projection 25 of the HDD 17. A second lock mechanism 157 is constructed to have the structure described above.

Thus, when in the unlocking position, as shown in FIG. 3, the slider 133 restricts the position of the first projection 25 of the HDD 17 so that the projection 25 can be inserted only into the middle portion of the notch 127 with respect to the direction of its depth. At the same time, the next process of operation cannot be started until the first projection 25 is inserted so that it runs against the bottom portion of the recess 149.

Figure 18:
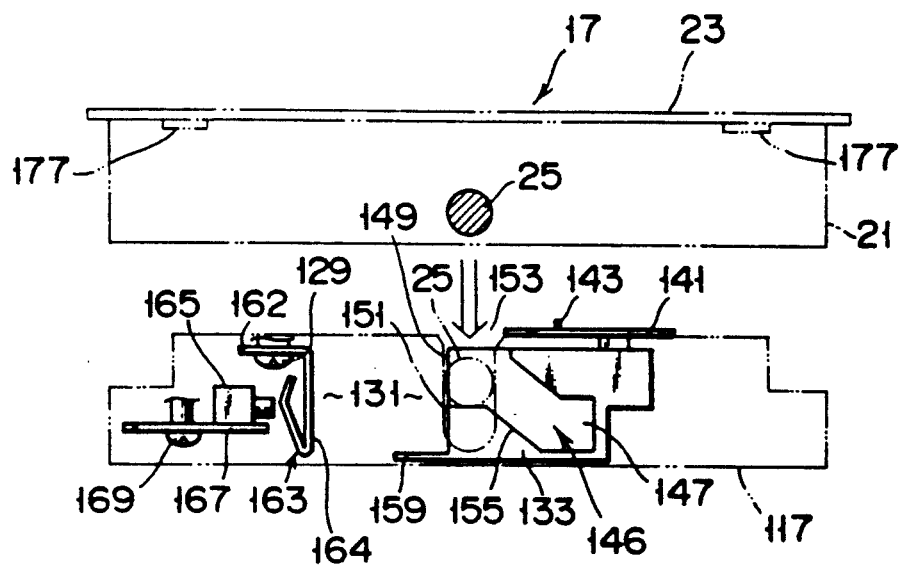
FIGS. 18 to 20 are front views successively showing processes in which a projection of the HDD is locked by means of the second lock mechanism shown in FIG. 16.
Figure 19:
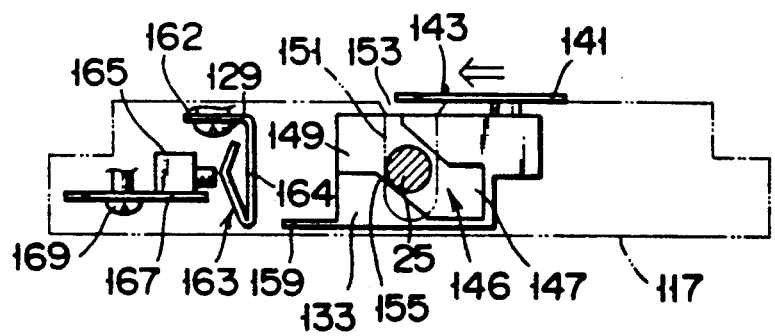
Figure 20:
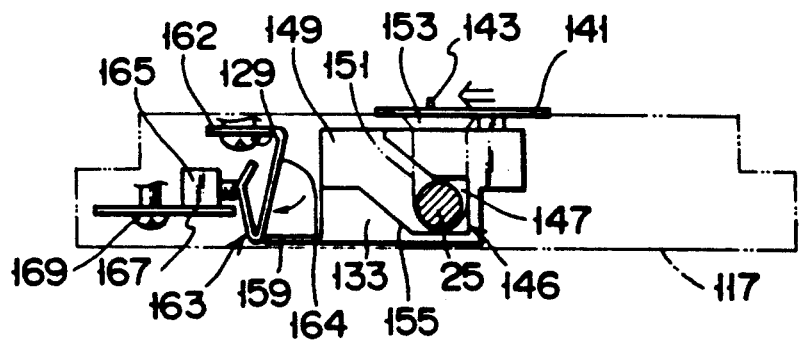

As shown in FIGS. 18 through 20, when the slider 133 is slid toward the locking position after the first projection 25 is inserted so that it runs against the bottom portion of the recess 149, the projection 25 is guided into the retaining groove 147 via the slant groove 155. Thereupon, the first projection 25 is moved from the position corresponding to the middle portion of the channel-shaped opening 151 to the position corresponding to the base of the opening 151. Thus, the first projection 25 is restricted by the combination of the crossed grooves. At this time, the knob 139 is exposed to the outside through the notch 31 of the cover 23, so that it never interferes with the HDD 17.

The second lock mechanism 157 for fixing the rear portion of the HDD 17 is designed so that the HDD 17 cannot be fully housed unless the fitting operation is suspended while the HDD 1 is being fitted into the recess 15.

The slider 133 has a plate portion 159 protruding from an end portion thereof nearer to the recess 149. The plate portion 159 projects on the left-hand side. The length of projection of the plate portion 159 is adjusted to a value such that the portion 159 is situated inside the cover 123 when the slider 133 is in the unlocking position, and projects from the cover 123 through an aperture 161 in the end wall of the cover 123 when the slider 133 is in the locking position. A leaf spring 163 is fixed to the lug 125 adjacent to the left-hand end of the cover 123, corresponding in position to the plate portion 159. The spring 163 includes a fixed portion 162 fixed together with the lug 125 and a movable portion 164 facing the opening of the aperture 161. Thus, the movable portion 164 of the leaf spring 163 shifts its position, following the plate portion 159 projecting or retreating from the aperture 161. A switch 165, along with a substrate 167, is disposed beside the movable portion 164 of the leaf spring 163 so that it is turned on and off as the movable portion 164 shifts its position. The switch 165 is connected to a power circuit section (not shown) of the HDD drive control circuit by means of the substrate 167. Thus, the HDD 17 is supplied with electric power when its rear portion is locked, and is disconnected from the power supply when the rear portion is unlocked. Numeral 169 denotes a screw for fixing the switch 165.

A tapped hole 171 is formed at each end portion of the top wall portion 119. Hole portions 173 are formed at the rear portion of the cover 23 of the HDD 17, corresponding in position to the holes 171. Thus, the housed HDD 17 can be fixed by screwing screws 175 individually into the tapped holes 171 through the hole portions 173. Numeral 177 denotes a boss of each hole portion 173.

In FIG. 1, numeral 179 denotes a latch.

In mounting the HDD 17 in the case 1, in the personal computer constructed in this manner, the HDD 17 is first held by fingers with the slider 133 in the unlocking position. Then, the second projections 27 of the HDD 17 are inserted into the openings 79 of the guide grooves 75 in a manner such that the HDD 17 is inclined as a whole in conformity to the angle of inclination of the grooves 75, with its front portion downward, as shown in FIG. 2. Subsequently, the whole HDD 17 is slid in accordance with the angle of inclination of the slant grooves 83. Thereupon, the front portion of the HDD 17 is guided into the recess 15. Thus, the front portion of the HDD 17 is obliquely inserted toward the side wall 77 which has the second connector 87.

As the second projections 27 are inserted to the exits of the slant grooves 83, the extreme end portion of the guide wall 59 of the first connector 41 abuts against the upper surface portion 112 of the second connector 87, as shown in FIGS. 12, 13, 21 and 22. As the guide 59 acts in this manner, the guide projections 47 of the first connector 41 are inserted individually into the respective openings of the recesses 95 of the second connector 87. At the same time, the extreme end portion of the ledge 49 of the first connector 41 is inserted into the opening of the recess 97 of the second connector 87. As the end portion of the guide wall 59 abuts against the upper surface portion 112, moreover, the chamfered portions of the hooks 29 engage the edges of the sockets 113 of the side wall 77, individually, as shown in FIG. 23.

Since the way of inserting the HDD 17 is restricted by the guidance of the guide grooves 75, the HDD 17 cannot be inserted with a force such that it is damaged thereby. Thus, the HDD 17 can be obliquely inserted into the recess 15 without being damaged.

As the HDD 17 is inserted in, this manner, its rear portion is situated over the notch 127, as shown in FIG. 3.

When the insertion of the HDD 17 is finished, its rear portion is pressed toward the base of the recess 15 by fingers, as indicated by vertical arrows in FIG. 21. Thereupon, the HDD 17 pivots around the point of contact between the extreme end portion of the guide wall 59 of the first connector 41 and the upper surface portion 112 of the second connector 87, so that the whole HDD 17 is fitted into the recess 15. As the HDD 17 pivots in this manner, the guide projections 47 of the first connector 41 are inserted individually into the bottom portions of the recesses 95 of the second connector 87, as shown in FIG. 24. At the same time, the ledge 49 of the first connector 41 is inserted into the bottom portion of the recess 97 of the second connector 87, as shown in FIG. 25. As the ledge 49 is fitted into the recess 97, a large number of first and second connections 57 and 101 slidingly overlap one another. As the HDD 17 pivots in the aforesaid manner, moreover, the projections 103 and 104 of the second connector 87 are fitted into the recesses 51 and 53 of the first connector 41, respectively.

The first and second connectors 41 and 87 can be smoothly connected, since the guide projections 47 and the recesses 95 are arcuate in shape and the extreme end portion of the ledge 49 and the edge of the recess 97 are arcuately chamfered.

As the HDD 17 pivots in the aforesaid manner, furthermore, the distal end portions of the hooks 29 come to engage the edges of their corresponding sockets 113. As a result, the front portion of the HDD 17 is gradually fixed by means of the retaining structure as well as through the connection between the connectors.

This motion is continued until the first projection 25 of the HDD 17 abuts against the base of the recess 149 corresponding to the middle portion of the channel-shaped opening 151, as shown in FIGS. 24 and 25.

It is feared that the HDD 17, which is structurally susceptible to an impulsive force, as is generally known, will be damaged by a shock produced when it is pushed in.

When the HDD 17 is pressed down to be entirely housed in the recess 15 after it is fully inserted an impulsive force corresponding to the distance of pivoting motion acts on the HDD 17. In other words, the longer the distance of rocking motion of the HDD 17 pressed down by fingers, the greater the impulsive force on the HDD 17 will be.

In pushing the HDD 17 into the recess 15, the first projection 25 engages the base of the recess 149, so that the motion of the HDD 17 is suspended while it is being fitted into the recess 15 after the insertion. Thus, the HDD 17 can be prevented from being pushed in with a damaging force.

After the HDD 17 is pressed so that the first projection 25 engages the base of the recess 149, as is also shown in FIG. 18, the knob 139, which is exposed through the notch 31 of the cover 23, is slid toward the left. Thereupon, the first projection 25 on the base of the recess 149 runs in the slant groove 155, as shown in FIG. 18, to be transferred to the retaining groove 147, as shown in FIG. 20. By doing this, the first projection 25 shifts its position from the middle portion of the channel-shaped opening 151 to the bottom portion. Thus, after the rocking motion of the HDD 17 around the extreme end portion of the guide wall 59 is suspended, it is continued by operating the knob 139, so that the HDD 17 is gradually fitted into its final position.

As the HDD 17 is pivoted in this manner, the insertion of the bosses 47 into the recesses 95, the insertion of the ledge 49 into the recess 97, and the engagement between the hooks 29 and the sockets 113, which have so far been suspended, are restarted and continued.

Figure 27:
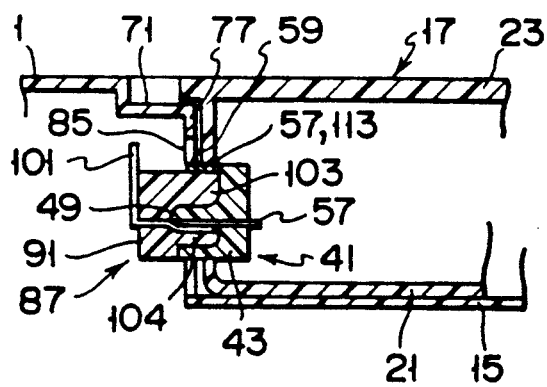
FIG. 27 is a sectional view showing a state in which the respective armatures of the first and second connectors overlap each other.

When the first projection 25 is then inserted into the retaining groove 147, the HDD 17 finishes being fitted into the recess 15, as shown in FIGS. 26 and 27. At the same time, the motion of the first projection 25 is restricted by the wall portion of the retaining groove 147 and the edge of the channel-shaped opening 151 crossing each other. In this manner, the rear portion of the fitted HDD 17 is locked. The moment the HDD 17 is fixed, moreover, the connectors 41 and 87 are fully connected to each other, as shown in FIGS. 26 and 27. Thus, the electronic devices in the case 1 and the ones in the HDD 17 are electrically connected without a cable by means of the first and second connectors 57 and 101 in contact with one another. In connecting the connectors 41 and 87 to each other, the projections 111 of the second connector 87 are fitted individually into the openings 61 of the first connector 41, as shown in the enlarged views of FIGS. 13 and 15, and the fitting wall 67 of the first connector 41 is fitted into the stepped portion 105 of the second connector 87. Thus, the connectors 41 and 87 are prevented from disconnecting from each other.

While the rear portion of the HDD 17 is fixed, the hooks 29 and the sockets 113 are fully engaged with one another, as shown in FIG. 28. Namely, the front portion of the HDD 17 is fixed by means of both the connection between the connectors and the retaining structure.

In this manner, the front and rear portions of the HDD 17 in the recess 15 are fixed in place.

The switch 165 is turned on by the plate portion 159, which projects from the cover 129 as the knob 139 is slid, and the leaf spring 163, which is elastically deformed as the portion 159 projects. The moment the HDD 17 is housed in place, therefore, the electronic devices therein are energized.

Figure 4:
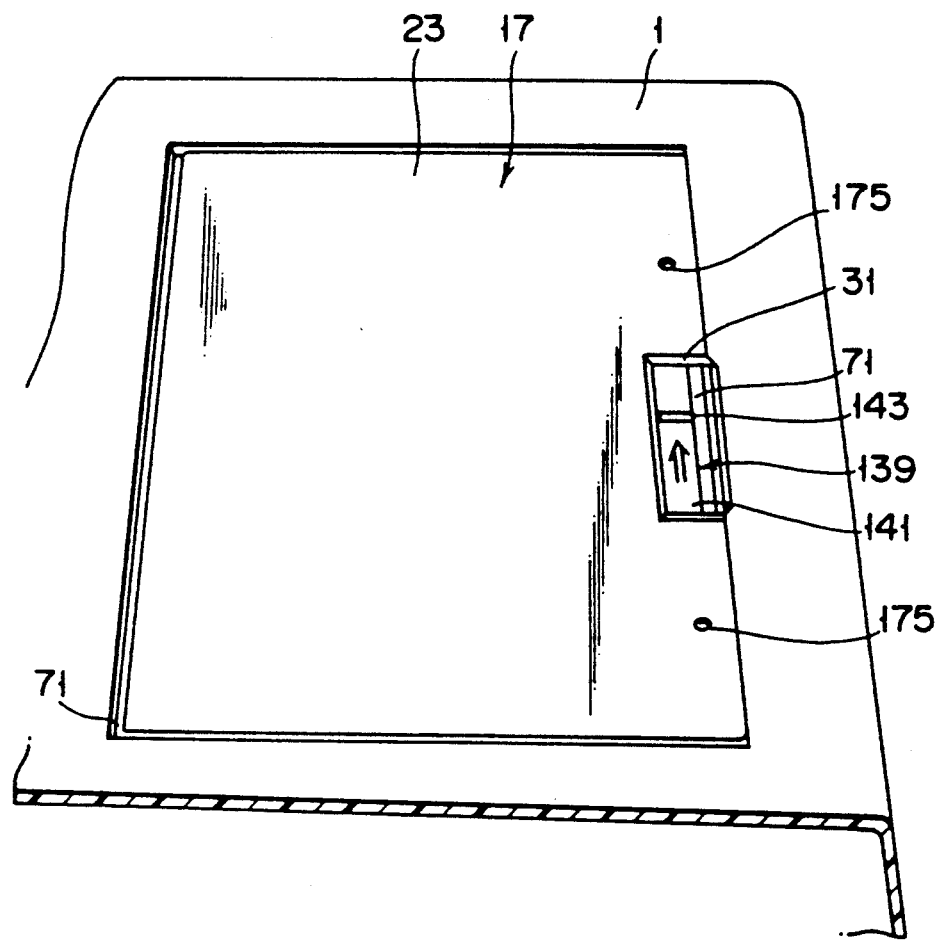
FIG. 4 is a perspective view showing a state in which the HDD shown in FIG. 2 is mounted in a recess of the case.
Figure 11:
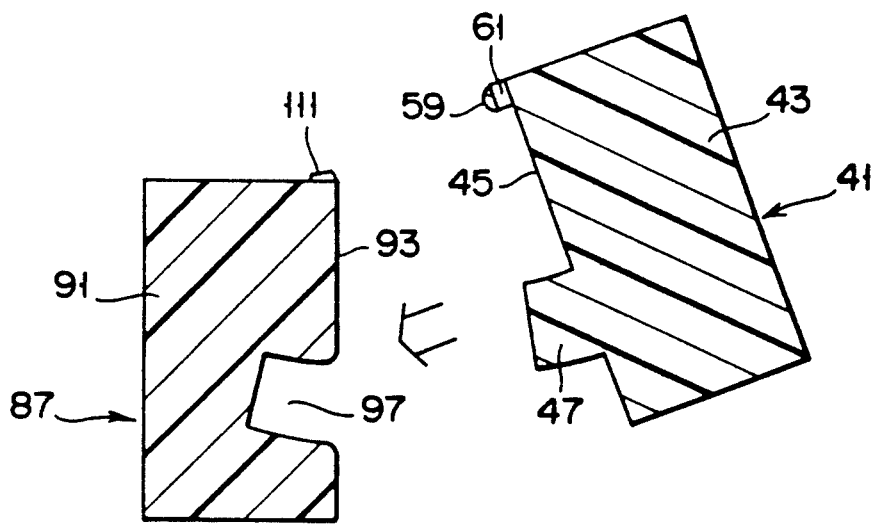
FIGS. 11 and 12 are sectional views successively showing the way the first and second connectors shown in FIG. 2 engage each other as the HDD is inserted.

When the screws 175, as shown in FIG. 2, are screwed individually into the tapped holes 171 of the top wall portion 119 through the hole portions 173 of the HDD 17, the HDD 17 is set on the base of the case 1 in a manner such that its cover 23 serves also as a wall portion of the case 1, as shown in FIG. 4.

Since the depth of depression of the HDD 17 is restricted by the second lock mechanism 157, the HDD 17 cannot be subjected to a substantial impact even when it undergoes a pressing operation which is liable to produce a great impulsive force. Thus, the reliability of the HDD 17 can be ensured. Since the HDD 17 is set on the base of the case 1, moreover, terminals (not shown) on the rear face of the case 1 are not limited in number.

Further, the HDD 17, having the connector 41 at one end portion thereof, can be set on the base of the case 1 so that the direction of its insertion is kept horizontal, with use of the mounting structure designed so as to obliquely insert and pivot the HDD 17. In the personal computer, therefore, the HDD 17 can be mounted in the case 1 without increasing the thickness of the case, so that the thinness of the computer can be maintained.

Since the way of inserting the HDD 17 is restricted by the guidance of the guide grooves 75, moreover, the HDD 17 is subjected to only a small impact during insertion.

Since the front portion of the HDD 17 is fixed by means of the lock mechanism 115 as well as the connectors 41 and 87, furthermore, the connected connectors 41 and 87 are subjected to only a small load. Thus, the connection of connectors 41 and 87 is highly reliable.

The HDD 17 can be removed from the case 1 by reversely following the aforementioned processes of mounting operation. Although it is feared that the removal of the HDD 17 will require a troublesome operation, it can be easily accomplished in the following manner. After the rear portion of the HDD 17, partially disconnected from the connectors 41 and 87, is projected from the opening of the recess 15 by sliding the slider 133 toward the unlocking position, the HDD 17 is drawn out with fingers on the rear portion.

The present invention may be also applied to a case in which a floppy disk drive device, optical disk drive device, or some other storage device, instead of the HDD, is set on the base of the case 1.

Further, the present invention is not limited to connectors which are electrically connected to each other in a manner such that their armatures come longitudinally into sliding contact with one another, and may be also applied to connectors which are connected in a manner such that their armatures come transversely into sliding contact.

Furthermore, the present invention may be also applied to a word processor or some other portable electronic apparatus than the personal computer.

Additional advantages and modifications will readily occur to those skilled in the art. Therefore, the invention in its, broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electronic apparatus comprising:
   a case having a base section and a recess formed in the base section, the recess having a bottom section, first and second walls and an opening;
   an electronic precision unit fitting in the recess, the electronic precision unit comprising a rectangular housing having first and second end portions;
   means, disposed in the recess, for guiding the electronic precision unit into the recess;
   means, disposed on the rectangular housing of the electronic precision unit, for engaging with the guiding means, the engaging means cooperating with the guiding means to obliquely guide the first end portion of the rectangular housing through the opening toward the first wall of the recess and pivot the electronic precision unit toward the recess; and
   a temporary stopper, disposed between the bottom section and the opening of the recess, for temporarily stopping the pivoting of the electronic precision unit at a position between the bottom section and the opening of the recess and releasing the electronic precision unit to enable the electronic precision unit to fit into the recess, the temporary stopper comprising:
   a projection disposed at the second end portion of the rectangular housing;
   a notch, foamed in the second wall of the recess along a direction substantially normal to the bottom section thereof, for receiving the projection; and
   a slider, slidable in a second direction substantially perpendicular to the direction of the notch along an outer surface of the second wall of the recess and being shiftable between an unlocking position and a locking position, for receiving the projection entering the notch in the unlocking position as the electronic precision unit pivots and guiding the projection of the electronic precision unit to lock the electronic precision unit in a final position in the recess when the slider is in the locking position.

2. An electronic apparatus according to claim 1, wherein said electronic precision unit is a hard disk drive unit.

3. An electronic apparatus according to claim 1, wherein the engaging means further comprises a connector, disposed on the first end portion of the rectangular housing, for electrically connecting the first end portion to the first wall of the recess in accordance with the inserting and the pivoting of the electronic precision unit.

4. An electronic apparatus according to claim 1, wherein the engaging means further comprises a projection, protruding from the first end portion of the housing, for abutting against the first wall of the recess when the electronic precision unit is obliquely guided into the recess and guiding the electronic precision unit into the recess.

5. An electronic apparatus according to claim 1, further comprising a lock mechanism for locking the first end portion of the housing into the recess in accordance with the pivoting of the electronic precision unit.

6. An electronic apparatus according to claim 5, wherein the lock mechanism comprises a hook, disposed at the first end portion of the rectangular housing, and a socket, disposed in the first wall of the recess, for engaging the hook in accordance with the pivoting of the electronic precision unit.

7. An electronic apparatus according to claim 1, wherein the slider comprises:
   a groove having a first end portion, the first end portion cooperating with the notch when the slider is in the unlocking position and restricting the projection to an intermediate position in the notch;
   a second end portion, extending in a third direction substantially perpendicular to the direction of the notch, for cooperating with the notch to restrict movement of the projection when the slider is in the locking position; and
   a middle portion, disposed between the first end portion of the groove and the second end portion of the groove, for guiding the projection in the groove into the second end portion when the slider is slid from the unlocking position to the locking position.

* * * * *